US012772305B2

(12) United States Patent
Ekkundi et al.

(10) Patent No.: US 12,772,305 B2
(45) Date of Patent: Oct. 20, 2026

(54) METHOD AND APPARATUS FOR MIGRATION AND CO-EXISTENCE DEPLOYMENTS BETWEEN SERVICE BASED ARCHITECTURE AND P2P ARCHITECTURES IN A WIRELESS COMMUNICATION SYSTEM

(71) Applicant: Samsung Electronics Co., Ltd., Gyeonggi-do (KR)

(72) Inventors: Manasi Ekkundi, Bangalore (IN); Avneesh Tiwari, Bangalore (IN); Neha Sharma, Bangalore (IN); Dongmyoung Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 358 days.

(21) Appl. No.: 18/734,537

(22) Filed: Jun. 5, 2024

(65) Prior Publication Data

US 2024/0422838 A1 Dec. 19, 2024

(30) Foreign Application Priority Data

Jun. 13, 2023 (IN) ............................ 202341040357
Dec. 5, 2023 (IN) ............................ 202341040357

(51) Int. Cl.
*H04W 76/10* (2018.01)
*H04W 76/20* (2018.01)
*H04W 92/20* (2009.01)

(52) U.S. Cl.
CPC ........... *H04W 76/10* (2018.02); *H04W 76/20* (2018.02); *H04W 92/20* (2013.01)

(58) Field of Classification Search
CPC ...... H04W 76/10; H04W 76/20; H04W 92/10
See application file for complete search history.

(56) References Cited

U.S. PATENT DOCUMENTS

2008/0207187 A1 8/2008 Maillard
2016/0261515 A1 9/2016 Gopinathan et al.
2019/0335532 A1* 10/2019 Kim ...................... H04W 12/06
2022/0191733 A1 6/2022 Ali et al.

FOREIGN PATENT DOCUMENTS

WO 2017/123004 7/2017
WO 2019/141894 7/2019

OTHER PUBLICATIONS

International Search Report dated Sep. 19, 2024 issued in counterpart application No. PCT/KR2024/007705, 7 pages.

* cited by examiner

*Primary Examiner* — Gbemileke J Onamuti
(74) *Attorney, Agent, or Firm* — The Farrell Law Firm, P.C.

(57) ABSTRACT

Methods and apparatuses are provided in which a message is received at a user equipment (UE) from one or more radio access network (RAN) nodes. The UE determines presence of an information element (IE) in the message. The UE determines an interface protocol supported by each of the one or more RAN nodes based on a value indicated in the IE. The UE establishes communication with a first RAN node of the one or more RAN nodes based on a priority associated with the interface protocol of the first RAN node.

20 Claims, 18 Drawing Sheets

METHOD AND APPARATUS FOR MIGRATION AND CO-EXISTENCE DEPLOYMENTS BETWEEN SERVICE BASED ARCHITECTURE AND P2P ARCHITECTURES IN A WIRELESS COMMUNICATION SYSTEM

CROSS-REFERENCE TO RELATED APPLICATION(S)

This application is based on and claims priority under 35 U.S.C. § 119 to Indian Provisional Patent Application No. 202341040357 and Indian patent application No. 202341040357, filed on Jun. 13, 2023, and Dec. 5, 2023, respectively, in the Indian Patent Office, the disclosures of which are incorporated herein by reference in their entirety

BACKGROUND

1. Field

The present disclosure relates generally to field of telecommunication networks, and more particularly, to a method and system for migration and co-existence deployments between a service-based architecture and point-to-point (P2P) architectures.

2. Description of Related Art $5^{th}$ generation (5G) mobile communication technologies define broad frequency bands such that high transmission rates and new services are possible, and can be implemented not only in "Sub 6 GHz" bands such as 3.5 gigahertz (GHz), but also in "Above 6 GHz" bands referred to as millimeter wave (mmWave), including 28 GHz and 39 GHz. In addition, it has been considered to implement $6^{th}$ generation (6G) mobile communication technologies (referred to as Beyond 5G systems) in terahertz (THz) bands (e.g., 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive MIMO for mitigating radio-wave path loss and increasing radio-wave transmission distances in mmWave, supporting numerologies (e.g., operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio-unlicensed (NR-U) aimed at system operations conforming to various regulation-related requirements in unlicensed bands, NR user equipment (UE) power saving, non-terrestrial network (NTN), which is UE-satellite direct communication for providing coverage in an area in which communication with terrestrial networks is unavailable, and positioning.

Moreover, there has been ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step random access channel (RACH) for new radio (NR)). There also has been ongoing standardization in system architecture/service regarding a 5G baseline architecture (e.g., service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as full dimensional multiple input-multiple output (MIMO) (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

The information disclosed herein is only for enhancement of understanding and should not be taken as an acknowledgement or any form of suggestion that this information forms what is known to a person skilled in the art.

SUMMARY

According to an embodiment, a method performed by a UE is provided. A message is received from one or more radio access network (RAN) nodes. Presence of an information element (IE) in the message is determined. An interface protocol supported by each of the one or more RAN nodes is determined based on value indicated in the IE. Communication with a first RAN node of the one or more RAN nodes is established based on a priority associated with the interface protocol of the first RAN node.

According to an embodiment, a UE is provided that includes a transceiver and a controller coupled with the transceiver. The controller is configured to receive a message from one or more RAN nodes, and determine presence of an IE in the message. The controller is also configured to determine an interface protocol supported by each of the one or more RAN nodes based on value indicated in the IE. The controller is further configured to establish communication with a first RAN node of the one or more RAN nodes based on a priority associated with the interface protocol of the first RAN node.

According to an embodiment, a method performed by a network entity in a wireless communication system is provided. An interface protocol to be used for transmitting the message to each of one or more RAN nodes is determined based on interface information stored in a routing table. The message is transmitted to the one or more RAN nodes using the determined interface protocol for each of the one or more RAN nodes.

According to an embodiment, a network entity in a wireless communication system is provided. The network entity includes a transceiver and a controller coupled with the transceiver. The controller is configured to determine an interface protocol to be used for transmitting a message to each of one or more RAN nodes based on interface information stored in a routing table. The controller is also configured to transmit the message to the one or more RAN nodes using the determined interface protocol for each of the one or more RAN nodes.

BRIEF DESCRIPTION OF THE DRAWINGS

The above and other aspects, features, and advantages of the disclosure will be more apparent from the following detailed description when taken in conjunction with the accompanying drawings, in which.

DETAILED DESCRIPTION

Figure 1A:
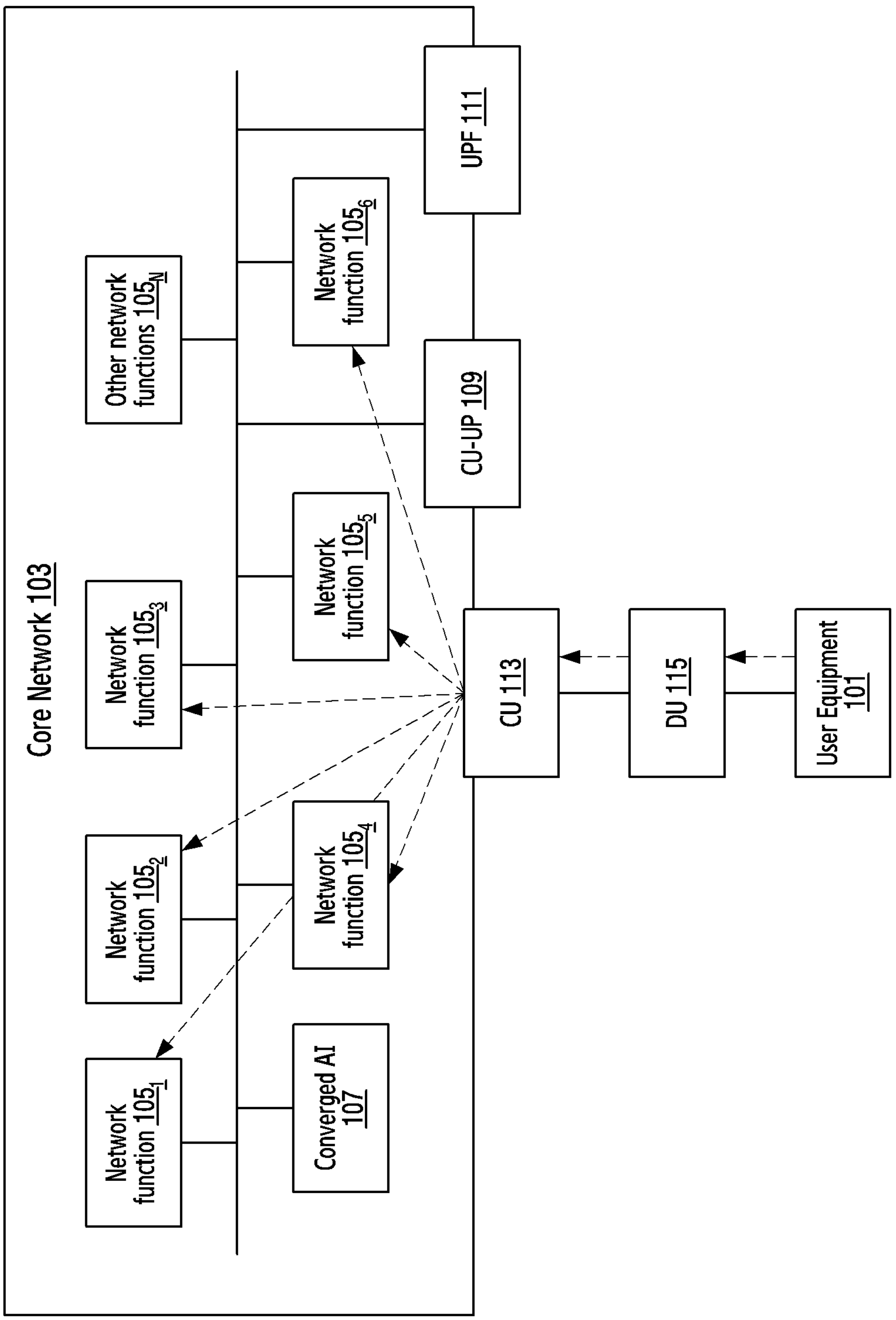
FIG. 1A is a diagram illustrating a service-based architecture.

Embodiments of the disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the specific forms disclosed, but on the contrary, the disclosure is to cover all modifications, equivalents, and alternative falling within the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

It shall be noted that, for convenience of explanation, the disclosure uses terms and names defined in the 3rd Generation Partnership Project (3GPP) RAN standards. More specifically, the terms 'service-based interface', 'P2P Interface', 'core network', 'system information block (SIB)', 'master information block (MIB)' and 'radio resource control (RRC) configuration message' are to be interpreted as specified by the 3GPP RAN standards.

Modern communication systems, such as the 5G mobile communication technology, have revolutionized a wide variety of industries with its increased speed, reduced latency and improved reliability. The 5G Network architecture consists of two parts-next generation-RAN (NG-RAN) and the 5G core network (5GC). The 5G system architecture shall leverage service-based interactions between control plane (CP) network functions. In this case, a set of network functions (NFs) provides services to other authorized NFs to access their services through a service-based interface (SBI). An NF service is one type of capability exposed by an NF (NF service producer) to other authorized NF (NF service consumer) through the service-based interface. The NF service may support one or more NF service operation(s). The network functions may offer different functionalities and thus different NF services are required to facilitate different functionalities. Each of the NF services offered by the network functions shall be self-contained, acted upon, and managed independently from the other NF services offered by the same network function (e.g., for scaling). A service-based interface represents how the set of services is provided or exposed by a given NF. This is the interface where the NF service operations are invoked. The 5G system architecture is based on the service-based interface.

In the existing 5G networks, NG-RAN is connected to the 5GC with P2P interfaces. As the wireless communication evolves to the next generations (i.e. 6G), the existing 5G-RAN nodes and 5GC will evolve to a new RAN node (e.g., 6G-RAN) and enhanced 5GC (e5GC) or 6G core network (6GC). In the evolution path of the wireless communication, the existing interfaces in between the RAN nodes and core network, which is P2P interface, may also evolve to SBI or combination of SBI and P2P interfaces. Also, with further enhancements to cloudification and virtualization of networks, the 6G networks may eventually support service-based RAN interface with the core network. However, the migration to fully service-based RAN, end-to-end service-based ecosystem with a UE, RAN, and core network may take some time to deploy. Operators may look to leverage their existing 5GC and evolve it further while providing a P2P and SBI to the 6G RAN to deploy quick 6G and leverage their existing network infrastructure. Due to the migration and evolution to new interfaces (e.g., SBI, SBI+P2P) or introduction of new nodes and functionalities (e.g., 6G-RAN, e5GC, 6GC etc.) there may arise some issues related to mobility, cell selection, re-selection of RAN nodes in co-existing deployments of networks. Therefore, there is a need to address the issues raised due to the migration and evolution to new interfaces and introduction of new nodes and functionalities.

FIG. 1A is a diagram illustrating an end to end service-based architecture. As shown in FIG. 1A, all the core network entities, such as NF's 105$_1$-105$_N$, UE 101, and RAN entities, such as control unit (CU) 113 and distributed unit (DU) 115, are connected to each other via the SBI (shown using dotted lines).

Figure 1B:
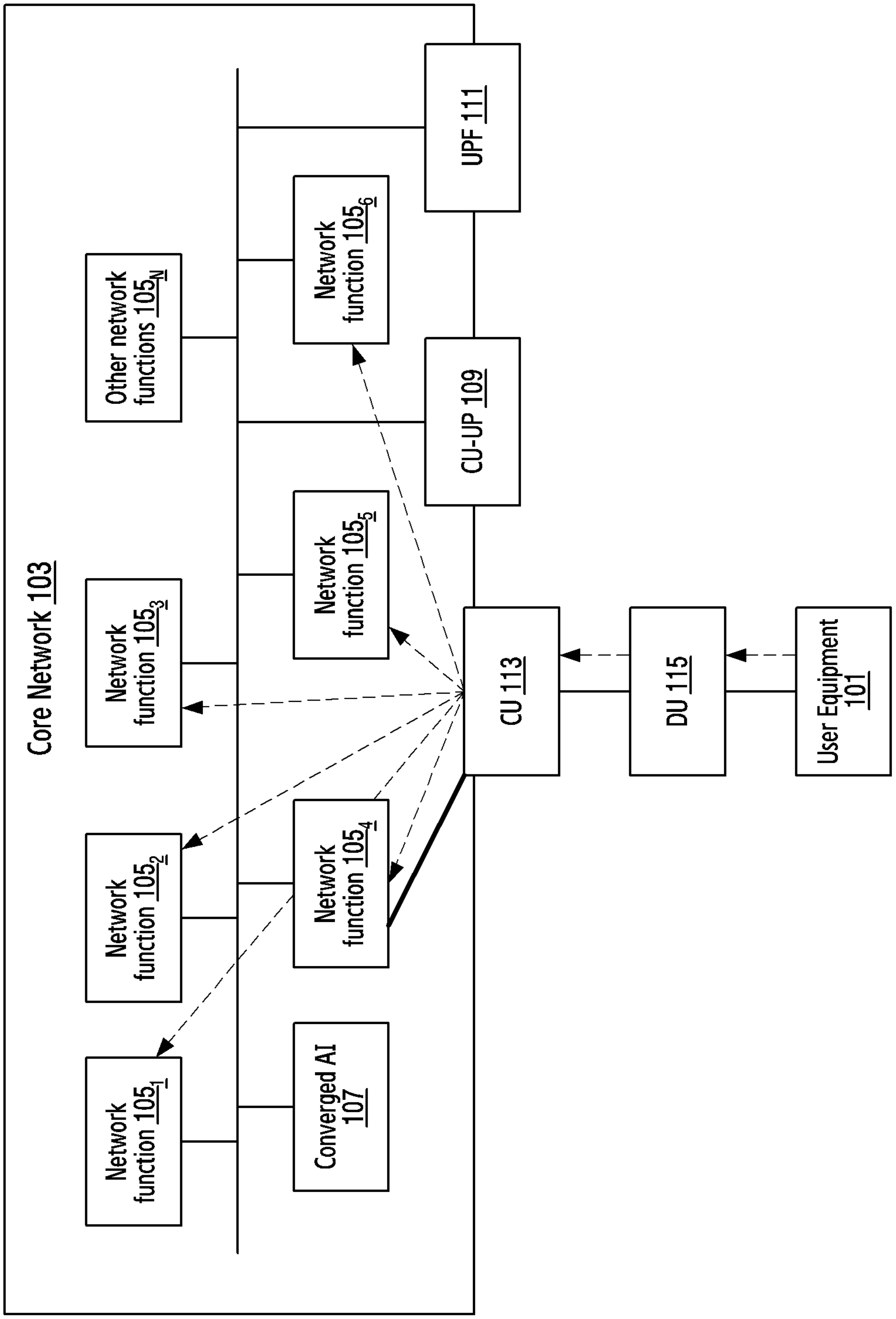
FIG. 1B is a diagram illustrating a combination of P2P and service-based architectures.

FIG. 1B is a diagram illustrating a combination of P2P and service-based architectures. FIG. 1B illustrates a combination of SBI and P2P interface. As shown in FIG. 1B, all the core network entities, such as NF's 105, UE 101, and RAN entities, such as CU 113 and DU 115, are connected with each other via SBI. In addition, the UE 101 and RAN entity 105 are also connected to the core network 103 via P2P interfaces (e.g., N1 interface, N2 interface, etc.). Hence, a combination of P2P and service-based architectures is shown in FIG. 1B. Here, in the combination of P2P and SBI interface architectures, the existing services/procedures/messages are carried over P2P interface and any additional/new services/procedures/messages are carried over SBI or any services/procedures/messages are over any of the interfaces in any/random order. In FIG. 1B, NF 105$_4$ is the core network anchor point to which the RAN, the CU 113, and the NF are connected via P2P interface (shown using bold line) and is also connected to the core network 103 via the SBI.

Figure 2A:
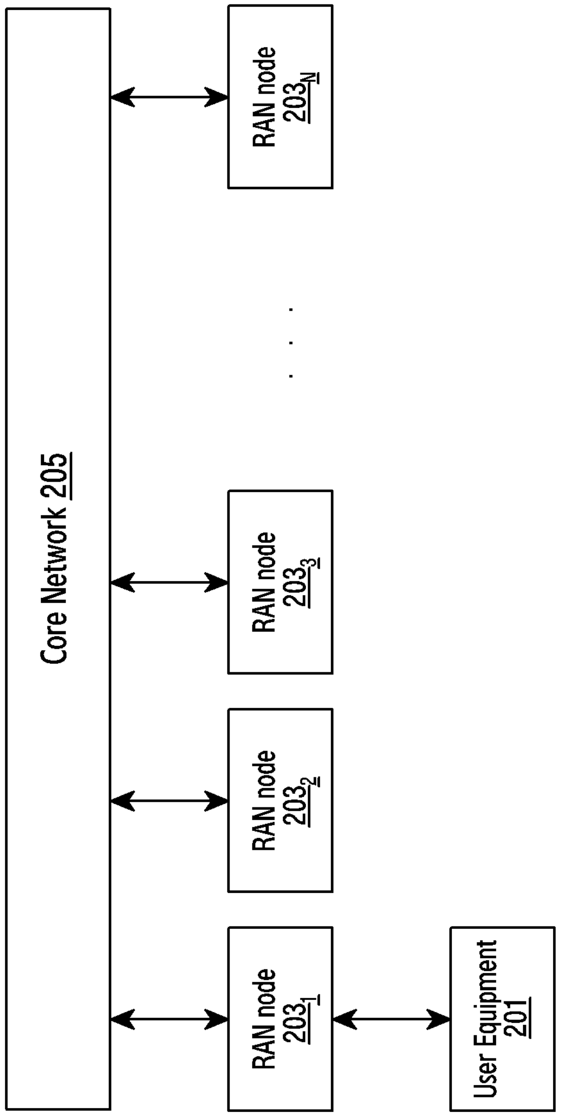
FIG. 2A is a diagram illustrating an architecture for communication between a RAN node and a UE, according to an embodiment.

FIG. 2A is a diagram illustrating an architecture for communication between a RAN node and a UE, according to an embodiment.

Architecture 200 includes a UE 201, one or more RAN nodes 203$_1$-203$_x$ (also referred to herein as one or more RAN nodes 203) associated with a core network 205. The core network 205 includes a plurality of interconnected NFs which are defined by the 3GPP for delivering the control plane functionality and user plane functionality of a communication system. In general, the plurality of interconnected NFs is interconnected NFs with each NF authorized to access the services of other NFs. As an example, the NFs may include, without limitation, a network slicing selection function (NSSF), a network exposure function (NEF), a NF repository function (NRF) and a policy control function (PCF).

In an embodiment, the UE 201 is configured to connect over the RAN node to the core network 205 including the plurality of network elements. As an example, the UE 201 may include, without limitation, any device used by a user to communicate and/or access content such as, but not limited to, mobile phones, smartphones, laptops, wearables, Internet of things (IoTs), and the like with 5G/6G capabilities. One or more RAN nodes 203 may be associated with the core network 205 using a predefined interface. The predefined interface may include, without limitation, one of a P2P interface, an SBI or combination of both the P2P interface and the SBI. As an example, the RAN node 203$_1$ shown in FIG. 2B is associated with the core network 205 using the combination of both the P2P interface and the SBI.

Figure 2B:
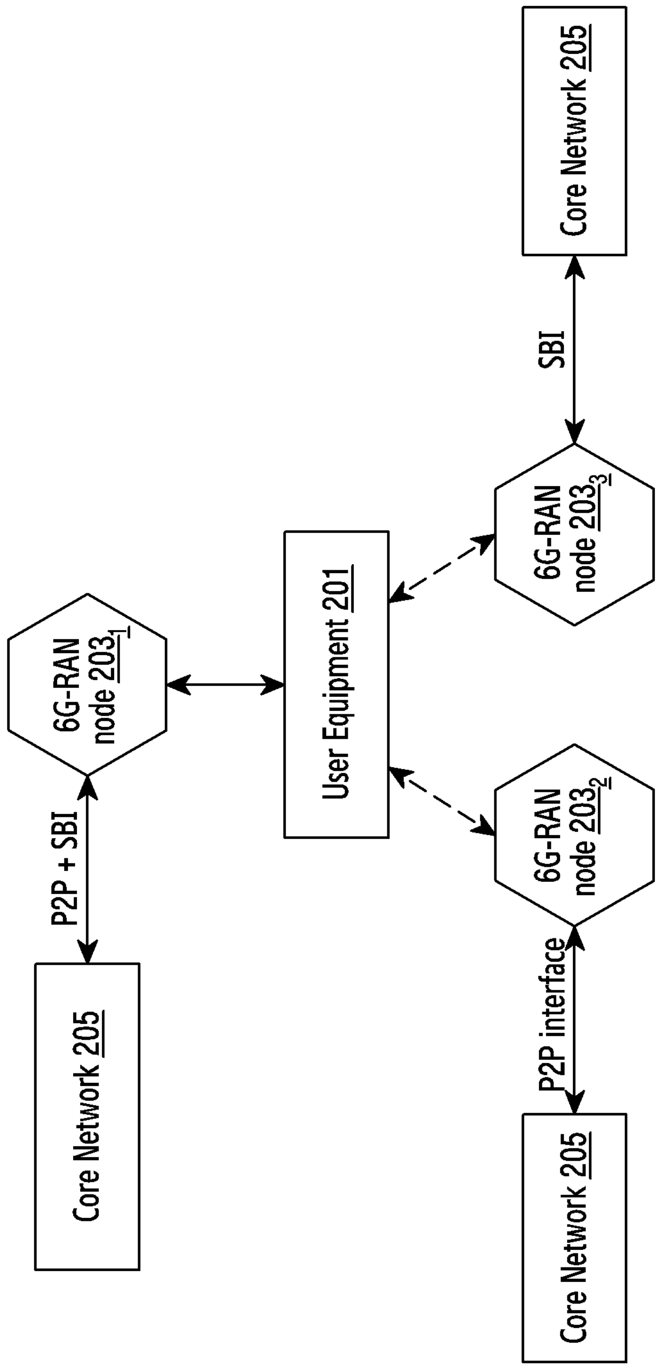
FIG. 2B is a diagram illustrating communication between a RAN node and a UE, according to an embodiment.

FIG. 2B is a diagram illustrating communication between a RAN node and a UE, according to an embodiment. The RAN node 203$_2$ is associated with the core network 205 using the P2P interface and the RAN node 203$_3$ is associated with the core network 205 using the SBI.

In an embodiment, the UE 201 may be configured to receive a message from one or more RAN nodes 203. The message may include, without limitation, one of, a SIB, a MIB, or an RRC configuration message. The SIB, MIB and RRC configuration message are various messages which are transmitted to the UE 201 from the RAN nodes. As an example, when the UE 201 is powered ON and the UE 201 establishes a connection with the RAN node, the UE 201 receives a SIB which includes the network information of the RAN node. Similarly, during the mobility of the UE 201 (i.e., during a handover of the UE 201), the UE 201 receives RRC configuration message that includes the network information of the neighboring RAN nodes. The UE 201 may have received the message during one of cell selection, handover, or cell reselection. When the UE 201 is turned ON or when the UE 201 moves to a new location, the UE 201 selects a cell to camp on. Whereas, handover or cell reselection is performed when the UE 201 decides to switch to different cell due to mobility of the UE 201. The cell may be a coverage are served by the RAN node. The message may be received by the UE 201 during one of cell selection, handover, or cell reselection.

In an embodiment, upon receiving the message, the UE 201 may be configured to determine presence of an IE in the message. The IE may be a unit of data that represents a specific information related to the network. As an example, the IE may be present in SIB2 message, the SIB2 message including the IE is shown below:

```
message c1: systemInformation: {
criticalExtensions systemInformation-r8: {
sib-TypeAndInfo {
sib2: {
.....
NewServicesIndication-rX ENUMERATED{True, False}
}
}
}}
```

In the above example, "NewServicesIndication-rX" is the IE which is present in the SIB2. The IE may be a part of any existing SIB or new SIB. Similarly, the IE may be a part of the MIB or RRC configuration message. When the UE 201 determines the absence of the IE in the message, the interface protocol supported by the RAN node from which the message is received supports P2P interface. The P2P interface may be a low priority interface.

In an embodiment, upon determining the presence of the IE, the UE 201 may be configured to determine an interface protocol supported by each RAN node in the one or more RAN nodes 203 based on value indicated in the IE. As an example, the IE may indicate two values, True (1) or False (0). This should not be construed as a limitation as IE may be indicated in any form apart from represented herein. When the value in the IE is True (1), this indicates that the RAN node supports SBI interface. Alternatively, when the IE is False (0), this indicates that the RAN node supports combination of both the P2P interface and the SBI. When the UE 201 determines the absence of the IE in the message received from the RAN node, this indicates that the RAN node supports P2P interface. As an example, the RAN node 203$_1$ shown in FIG. 2B is associated with the core network 205 using the combination of both the P2P interface and the SBI and the UE 201 is currently associated with the RAN node 203$_1$. During the handover or cell reselection of the UE 201, the UE 201 receives the message from the neighboring RAN nodes 203$_2$ and 203$_3$. The RAN node 203$_2$ is associated with the core network 205 using the P2P interface and the RAN node 203$_3$ is associated with the core network 205 using the SBI. Therefore, the UE 201 determines the absence of IE in the message received from the RAN node 203$_2$ which indicates a P2P only interface at this RAN node. Similarly, UE 201 determines the presence of the IE in the message received from the RAN node 203$_3$ as the RAN node 203$_3$ supports SBI interface. Specifically, the IE message may indicate the value True (1) which indicates that the RAN node supports the SBI. Based on the messages received, the UE 201 determines the interface protocol supported by each RAN node in the one or more RAN nodes 203.

In an embodiment, upon determining the interface protocol supported by each RAN node in the one or more RAN nodes 203, the UE 201 may be configured to establish a communication with a RAN node in the one or more RAN nodes 203 based on a priority associated with the interface protocol of the RAN node. The RAN node supporting SBI or combination of both the P2P interface and the SBI may be configured as a higher priority interface than the RAN node supporting the P2P interface. The RAN node supporting the P2P interface may be termed as a lower priority. Considering the exemplary FIG. 2B, the UE 201 is currently associated with the RAN node 203$_1$. During the handover of the UE 201, the UE 201 receives the message from the neighboring RAN nodes 203$_2$ and 203$_3$. As shown in the FIG. 2B, the RAN node 203$_2$ is associated with the core network 205 using the P2P interface and the RAN node 203$_3$ is associated with the core network 205 using the SBI. Based on the message received from the RAN nodes 203$_2$ and 203$_3$, the UE 201 establishes a communication with the RAN node 203$_3$ as the RAN node 203$_3$ supports the SBI which has a higher priority than the P2P interface which is supported by the RAN node 203$_2$. In some scenarios the UE 201 unsubscribes the RAN node providing services through a higher priority interface protocol when the UE 201 establishes connection with the available RAN nodes 203, which are capable of providing services through the lower priority interface protocol during one of handover of the UE 201 or cell reselection of the UE 201. The unsubscribing scenario is explained in greater detail below with respect to FIGS. 8A and 8B.

In an embodiment, the IE may be introduced in "Measurement Configuration" received from the one or more RAN nodes 203. The Measurement Configuration contains measurement object information. The measurement object can carry the interface information for that object. Within the measurement object, the associated cell information is present which may be used to indicate the associated interface information for that cell. An example of Measurement Configuration is shown below:

```
-- ASN1START
-- TAG-MEASOBJECTTOADDMODLIST-START
MeasObjectToAddModList ::=          SEQUENCE (SIZE (1..maxNrofObjectId)) OF
MeasObjectToAddMod
MeasObjectToAddMod ::=              SEQUENCE {
   measObjectId                     MeasObjectId,
   measObject                       CHOICE {
      measObject6G                     MeasObject6G,
         cellsToAddModList             CellsToAddModList   OPTIONAL, -- Need N
}
-- TAG-MEASOBJECTTOADDMODLIST-STOP
-- ASN1STOP
```

The IE may be introduced in "Measurement Configuration" received from the one or more RAN nodes 203. In the example below, "NewServicesIndication-rX" is the IE which is present in the Measurement Configuration:

```
-- ASN1START
-- TAG-MEASOBJECT6G-START
CellsToAddModList ::=            SEQUENCE (SIZE (1..maxNrofCellMeas)) OF
CellsToAddMod
CellsToAddMod ::=              SEQUENCE {
   physCellId                 PhysCellId,
   cellIndividualOffset          Q-OffsetRangeList
   NewServicesIndication-rX    ENUMERATED{True, False}
...
}
-- TAG-MEASOBJECT6G-STOP
-- ASN1STOP
```

The IE may indicate two values, True (1) or False (0). When the value in the IE is True (1), this indicates that the RAN node supports SBI interface. Alternatively, when the IE is False (0), this indicates that the RAN node supports combination of both the P2P interface and the SBI. In some embodiments, when the UE 201 determines the absence of the IE in the message received from the RAN node, this indicates that the RAN node supports P2P interface. The UE 201 may use the IE related information to prioritize the measurement reports to establish connection using high priority interface protocols during handovers. The IE with values is shown below:

```
If NewServicesIndication-rX is true (1)
   RAN node supports SBI interface framework.
If NewServicesIndication-rX is false (0)
   RAN node supports SBI+P2P interface framework.
If NewServicesIndication-rX is "not present"
   RAN node supports P2P interface framework.
```

In an embodiment, during Conditional Hand Over (CHO) procedure, the conditional configuration contains "conditional execution condition" which may contain "measID". The "measID" maps to the "MeasObjectID". The "MeasObjectID" may contain the IE to indicate the interface aspect for the one or more RAN nodes 203. A Conditional Configuration containing "measID" is shown below:

```
-- ASN1START
-- TAG-CONDRECONFIGTOADDMODLIST-START
CondReconfigToAddModList-r16 ::= SEQUENCE (SIZE (1.. maxNrofCondCells-r16))
OF CondReconfigToAddMod-r16
CondReconfigToAddMod-r16 ::=           SEQUENCE {
   condReconfigId-r16                CondReconfigId-r16,
   condExecutionCond-r16               SEQUENCE (SIZE (1..2)) OF MeasId
OPTIONAL, -- Need M
-- TAG-CONDRECONFIGTOADDMODLIST-STOP
-- ASN1STOP
```

The UE 201 may use the IE related information to prioritize the measurement reports to establish connection using high priority interface protocols during CHO. A Conditional Configuration containing "measID" which maps to the "MeasObjectID" is shown below:

```
-- ASN1START
-- TAG-MEASIDTOADDMODLIST-START
MeasIdToAddModList ::=                SEQUENCE (SIZE (1..maxNrofMeasId)) OF
MeasIdToAddMod
MeasIdToAddMod ::=               SEQUENCE {
   measId                      MeasId,
   measObjectId                     MeasObjectId,
   reportConfigId                   ReportConfigId
}
-- TAG-MEASIDTOADDMODLIST-STOP
-- ASN1STOP
```

Information blocks that may contain the IE during scenarios such as cell selection, cell reselection, handover, and RLF are shown below:

1. Cell Selection: For cell-selection, the UE 201 may use SIB1 or SIB2 broadcast from the one or more RAN nodes 203 in order to determine the supported interfaces and to select the RAN node from the one or more RAN nodes 203, as per the priority (i.e., SBI Interface>SBI+P2P Interface>P2P Interface). An SIB block is shown below:

```
message c1: systemInformation: {
criticalExtensions systemInformation-r8: {
sib-TypeAndInfo {
sib2: {
.....
NewServicesIndication-rX   ENUMERATED{True, False}
}
}
}}
```

2. Cell-Reselection: In scenarios, such as, when UE 201 is in IDLE or INACTIVE mode, the UE 201 may use dedicated SIBs (e.g., SIB3 or SIBn) broadcast from the one or more RAN nodes 203 to determine the supported interfaces and to select the RAN node from the one or more RAN nodes 203, as per the priority (i.e., SBI Interface>SBI+P2P Interface>P2P Interface). An SIB block is shown below:

```
SIB3 ::= SEQUENCE {
intraFreqNeighCellList IntraFreqNeighCellList OPTIONAL, -- Need R
...
}
IntraFreqNeighCellList ::= SEQUENCE (SIZE (1..maxCellIntra)) OF
IntraFreqNeighCellInfo
IntraFreqNeighCellInfo ::= SEQUENCE {
physCellId   PhysCellId,
NewServicesIndication-rX   ENUMERATED{True, False}
...
}
```

3. Handover: In a scenario of handover, Measurement Configuration contains measurement object information. The measurement object can carry the interface information for that object. Within a measurement object, the associated cell information is present. This can be used to indicate the associated interface information for that cell. An example of Measurement Configuration is shown below:

```
-- ASN1START
-- TAG-MEASOBJECTTOADDMODLIST-START
MeasObjectToAddModList ::=                SEQUENCE (SIZE (1..maxNrofObjectId))
OF MeasObjectToAddMod
MeasObjectToAddMod ::=                SEQUENCE {
   measObjectId                     MeasObjectId,
   measObject                     CHOICE {
      measObject6G                     MeasObject6G,
         cellsToAddModList               CellsToAddModList   OPTIONAL, --
Need N
}
-- TAG-MEASOBJECTTOADDMODLIST-STOP
-- ASN1STOP
```

An example of measurement object information is shown below:

```
-- ASN1START
-- TAG-MEASOBJECT6G-START
CellsToAddModList ::=                SEQUENCE (SIZE (1..maxNrofCellMeas)) OF
CellsToAddMod
CellsToAddMod ::=                SEQUENCE {
   physCellId                     PhysCellId,
   cellIndividualOffset              Q-OffsetRangeList
   NewServicesIndication-rX        ENUMERATED{True, False}
...
}
-- TAG-MEASOBJECT6G-STOP
-- ASN1STOP
```

4. Conditional Handover: In the CHO procedure, the conditional configuration contains "conditional execution condition" which may contain "measID". The "measID" maps to the "MeasObjectID". The "MeasObjectID" may contain the IE to indicate the interface aspect for the one or more RAN nodes 203. A Conditional Configuration containing "measID" is shown below:

```
-- ASN1START
-- TAG-CONDRECONFIGTOADDMODLIST-START
CondReconfigToAddModList-r16 ::= SEQUENCE (SIZE (1.. maxNrofCondCells-
r16)) OF CondReconfigToAddMod-r16
CondReconfigToAddMod-r16 ::=              SEQUENCE {
   condReconfigId-r16                  CondReconfigId-r16,
   condExecutionCond-r16                  SEQUENCE (SIZE (1..2)) OF MeasId
OPTIONAL, -- Need M
-- TAG-CONDRECONFIGTOADDMODLIST-STOP
-- ASN1STOP
```

5. RLF: After RLF, the UE 201 shall attempt on the similar RAT/RAN Node/Interface for connection re-establishment as per existing procedures. If the re-establishment fails due to any reason, the UE 201 may move to RRC_IDLE state and the UE 201 may perform cell selection based on the priority. The RLF scenario is described in greater detail with respect to FIG. 6C.

Figure 3A:
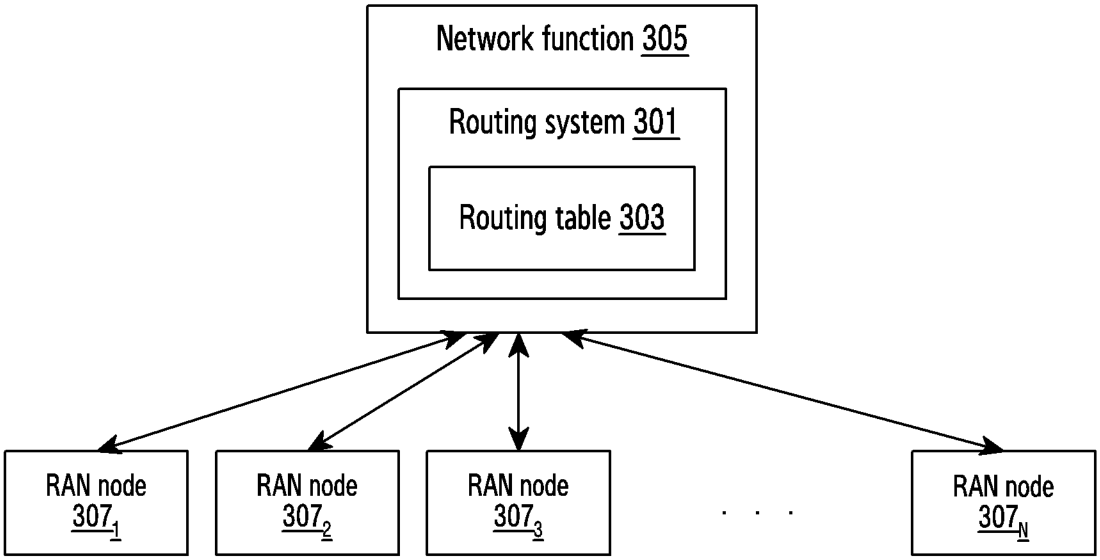
FIG. 3A is a diagram illustrating an architecture for communication between a network function and a plurality of RAN nodes, according to an embodiment.

FIG. 3A is a diagram illustrating an architecture for communication between a network function and a plurality of RAN nodes, according to an embodiment.

Architecture 300 includes a network function 305, a routing system 301, a routing table 303, and one or more RAN nodes $\mathbf{307}_1$-$\mathbf{307}_N$ associated with the network function 305. A core network 205 includes a plurality of interconnected NFs which are defined by the 3GPP for delivering the control plane functionality and user plane functionality of a communication system. In general, the plurality of NFs are interconnected NFs with each NF authorized to access the services of other NFs. As an example, the NFs may include, without limitation, an NSSF, an NEF, an NRF, and a PCF.

In an embodiment, a message such as paging information, a broadcast message, or a multicast message may be transmitted by the network function 305 to one or more RAN nodes 307. The messages are transmitted using the interface protocol which was used for initial connection with the network function 305. The routing system 301 may include a routing table 303, which stores information related to the interface protocol used between each RAN node and the network function 305 for an initial connection. The interface protocol may include, without limitation, one of a P2P interface, an SBI, or combination of both the P2P interface and the SBI. The routing table 303 includes a plurality of entries including a serial number of a RAN node, a truth value for each of one or more interface protocols used by the RAN node, and a type of interface supported by the RAN node.

Figure 3B:
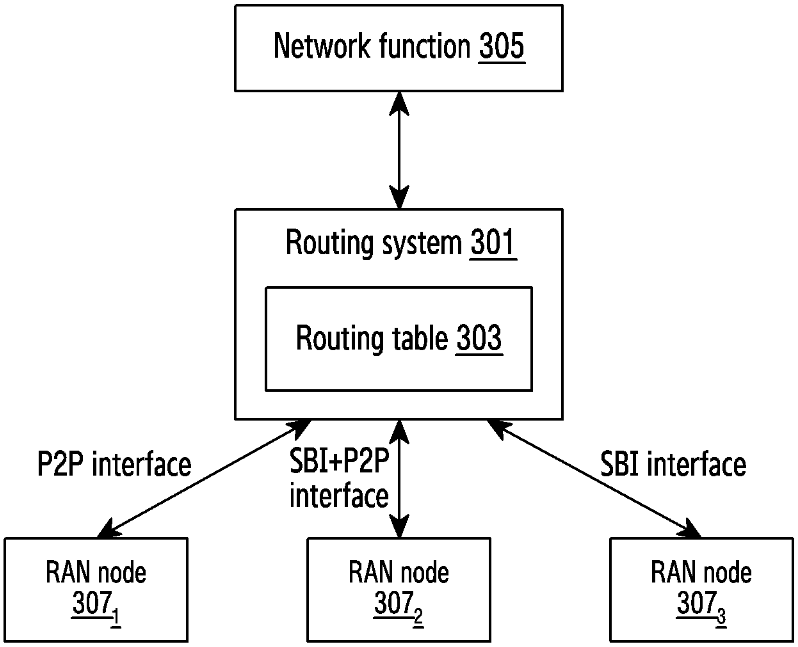
FIG. 3B is a diagram illustrating communication between a network function and a plurality of RAN nodes, according to an embodiment.

FIG. 3B is a diagram illustrating communication between a network function and a plurality of RAN nodes, according to an embodiment. The routing system 301, which includes the routing table 303, may be external to the network function 305 and is communicatively connected with the network function 305, as shown in FIG. 3B. As an example, the network function 305 may be an access and mobility function (AMF). A routing table for the RAN nodes shown in FIG. 3B is shown in Table 1 below:

TABLE 1

| Serial number of RAN node | Initial setup-P2P | Initial setup- SBI | Interface supported by the RAN node |
|---|---|---|---|
| $307_1$ | TRUE | FALSE | P2P |
| $307_2$ | TRUE | TRUE | P2P, SBI |
| $307_3$ | FALSE | TRUE | SBI |

As shown in the FIG. 3B, the initial setup of the RAN node $\mathbf{307}_1$ was based on the P2P interface. The value set for initial setup-P2P for the RAN node $\mathbf{307}_1$ in the routing table 303 is TRUE and the value set for initial setup-SBI for the RAN node $\mathbf{307}_1$ in the routing table 303 is FALSE. As shown in the FIG. 3B, the RAN node $\mathbf{307}_2$ supports combination of both the P2P interface and the SBI. However, the initial setup of the RAN node $\mathbf{307}_2$ was based on P2P interface. The value set for initial setup P2P for the RAN node $\mathbf{307}_2$ in the routing table 303 is TRUE and the value set for initial setup SBI for the RAN node $\mathbf{307}_2$ in the routing table 303 is TRUE, as the RAN node $\mathbf{307}_2$ supports both the interface protocols. However, as the initial connection with the network function 305 was based on the P2P interface, the network function 305 uses P2P interface for transmitting the message. As shown in the FIG. 3B, the RAN node $\mathbf{307}_3$ supports the SBI. The value set for initial setup P2P for the RAN node $\mathbf{307}_3$ in the routing table 303 is FALSE and the value set for initial setup SBI for the RAN node $\mathbf{307}_3$ in the routing table 303 is TRUE.

In an embodiment, the routing system 301 may be configured to receive a message from a network function 305 in the core network 205 for transmitting the message to the one or more of the plurality of RAN nodes. As an example, the message may be a paging information, a broadcast message, or a multicast message, which may be sent to the one or more RAN nodes. Prior to receiving the message, the routing system 301 receives the information related to the interface protocol used between each RAN node and the network function 305 for an initial connection. The information related to the interface protocol is stored in the routing table 303. A routing table is shown in Table 1 above.

In an embodiment, upon receiving the message, the routing system 301 may be configured to determine an interface protocol to be used for transmitting the message to each RAN node in the one or more RAN nodes 203 based on an interface information stored in the routing table 303. As shown in the FIG. 3B, the interface protocol supported by each RAN node is shown. A routing table shown in Table 1 above indicates the values associated with initial setup of each RAN node shown in FIG. 3B. Based on the values in the routing table 303, the routing system 301 determines the interface protocol to be used for transmitting the message to each RAN node in the one or more RAN nodes. As an example, the interface protocol determined by the routing system 301 for the RAN node $307_3$ based on the information stored in the routing table 303 is SBI interface.

In an embodiment, upon determining the interface protocol, the routing system 301 may be configured to transmit the message to the one or more RAN nodes using the determined interface protocol for each RAN node. The routing system 301 may encapsulate the message according to the determined interface protocol. Referring to FIG. 3B and Table 1, the routing system 301 may encapsulate and transmit the message to the RAN node $307_1$ and to the RAN node $307_2$ using the P2P interface. Alternatively, the routing system 301 may encapsulate and transmit the message to the RAN node $307_3$ using SBI.

Figure 4:
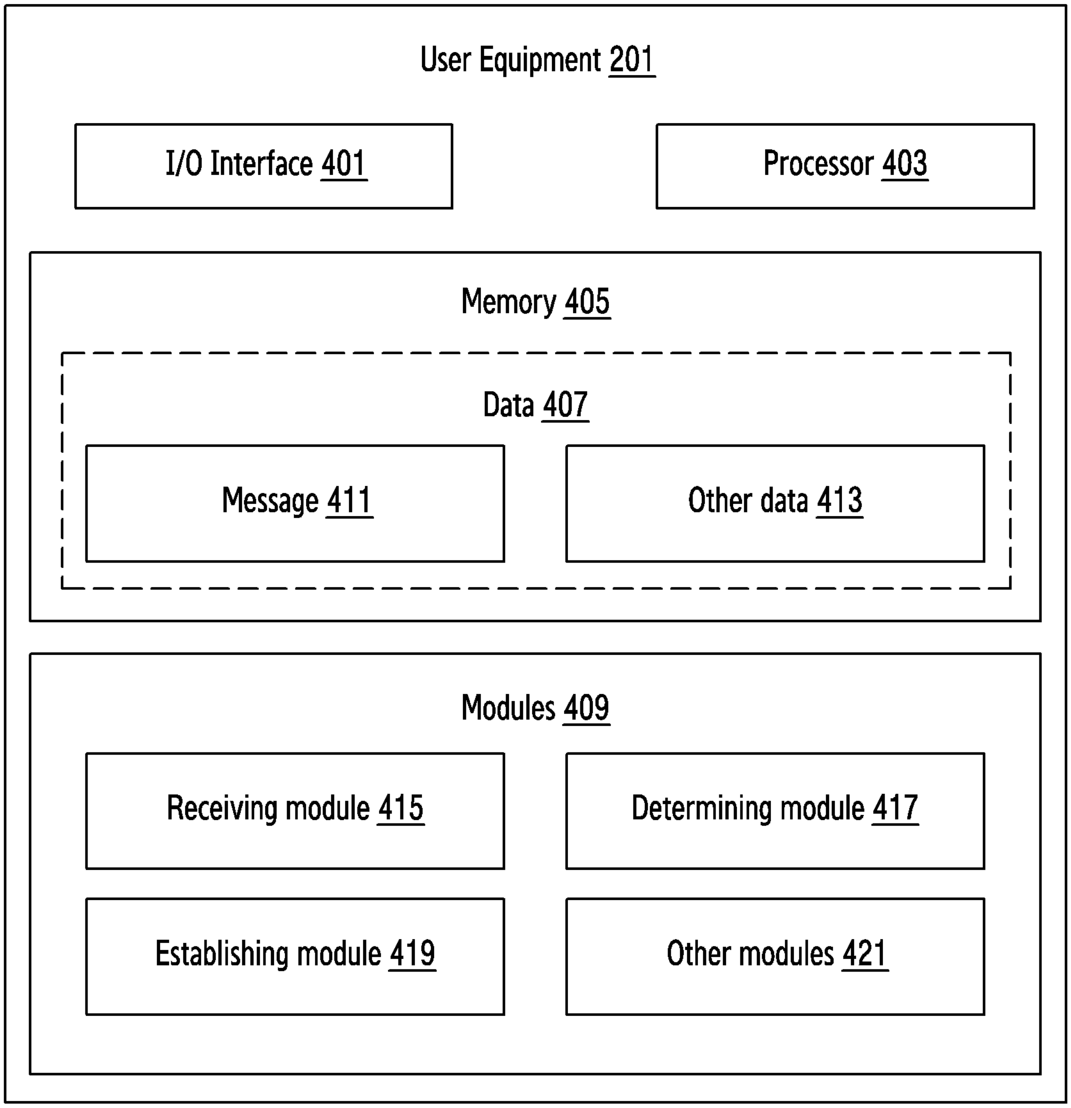
FIG. 4 is a diagram illustrating a UE, according to an embodiment.

FIG. 4 is a diagram illustrating a UE, according to an embodiment.

In some implementations, the UE 201 may include an I/O interface 401, a processor 403 and a memory 405. The memory 405 may be communicatively coupled to the processor 403. The processor 403 may be configured to perform one or more functions of the UE 201 for communication with a RAN node, using the data 407 and the one or more modules 409 of the UE 201. The memory 405 may store data 407.

In an embodiment, the data 407 stored in the memory 405 may include, without limitation, a message 411 and other data 413. The data 407 may be stored within the memory 405 in the form of various data structures. Additionally, the data 407 may be organized using data models, such as relational or hierarchical data models. The other data 419 may include various temporary data and files generated by the one or more modules 409.

In an embodiment, the message 411 may be a message 411 which is received by the UE 201 from the one or more RAN nodes 203. The UE 201 may receive the message 411 during one of handover of the UE 201, cell selection of the UE 201, or cell reselection of the UE 201. The message 411 may include, without limitation, one of a SIB, MIB, or a RRC configuration message. As an example, the SIB may be received during cell reselection. The RRC configuration message may be received during UE 201 handover. An IE may be present in the message 411. The IE may be a unit of data that represents a specific information related to the network. As an example, the IE may be present in SIB2 message. The IE may not be present in the message 411. Based on the presence of the IE in the message 411, the UE 201 determines the interface protocol supported by each RAN node and the UE 201 establishes a communication with a RAN node in the one or more RAN nodes 203 based on a priority associated with the interface protocol of the RAN node.

In an embodiment, the data 407 may be processed by one or more modules 409 of the UE 201. The one or more modules 409 may be communicatively coupled to the processor 403 for performing one or more functions of the UE 201. The one or more modules 409 may include, without limiting to, a receiving module 415, a determining module 417, an establishing module 419 and other modules 421.

As used herein, the term module may refer to an application specific integrated circuit (ASIC), an electronic circuit, a hardware processor 403 (shared, dedicated, or group) and memory that execute one or more software or firmware programs, a combinational logic circuit, and/or other suitable components that provide the described functionality. Each of the one or more modules 409 may be configured as stand-alone hardware computing units. The other modules 421 may be used to perform various miscellaneous functionalities on the UE 201. It will be appreciated that such one or more modules 409 may be represented as a single module or a combination of different modules.

In an embodiment, the receiving module 415 may be configured for receiving a message 411 from one or more RAN nodes 203. The message 411 may include, without limitation, one of an SIB, an MIB or an RRC configuration message. The SIB, MIB and RRC configuration message are various messages 411 which are transmitted to the UE 201 from the RAN node. As an example, when the UE 201 is powered ON and the UE 201 establishes a connection with the RAN node, the receiving module 415 receives the SIB which includes the network information of the RAN node. Similarly, during the mobility of the UE 201 i.e., during a handover of the UE 201, the receiving module 415 receives RRC configuration message which includes the network information of the neighboring RAN node. The UE 201 may have received the message 411 during one of cell selection, handover or cell reselection.

In an embodiment, the determining module 417 may be configured for determining presence of an IE in the message 411. The IE may be a unit of data that represents a specific information related to the network. As an example, the IE may be present in SIB2 message 411. The IE may not be present in the message 411, which indicates that the interface protocol (e.g., P2P interface) supported by the RAN node which is used to send the message 411 may be a lower priority.

In an embodiment, the determining module 417 may also be configured for determining upon determination of the presence of the IE, an interface protocol supported by each RAN node in the one or more RAN nodes 203 based on value indicated in the IE. As an example, the IE may indicate two values, True (1) or False (0). When the value in the IE is True (1), this indicates that the RAN node supports SBI interface. Alternatively, when the IE is False (0), this indicates that the RAN node supports combination of both the P2P interface and the SBI. This should not be construed as limitation. Therefore, when the determining module 417 determines the value in the IE is True (1), this indicates that the RAN node supports SBI interface and when the determining module 417 determines the value in the IE is False (0), this indicates that the RAN node supports combination of both the P2P interface and the SBI. When the determining module 417 determines the absence of the IE in the message 411 received from the RAN node, this indicates that the RAN node supports P2P interface.

In an embodiment, the establishing module 419 may be configured for establishing a communication with the RAN node in the one or more RAN nodes 203 based on a priority associated with the interface protocol of the RAN node. The RAN node supporting SBI or combination of both the P2P interface and the SBI have a higher priority than the RAN node supporting the P2P interface. The communication may be established based on the priority associated with the interface protocol of the RAN node. While establishing the communication using the establishing module 419, the UE 201 may unsubscribe the RAN node providing services through a higher priority interface protocol when the UE 201 establishes connection with the available RAN node which are capable of providing services through the lower priority interface protocol during one of handover of the UE 201 or cell reselection of the UE 201.

Figure 5:
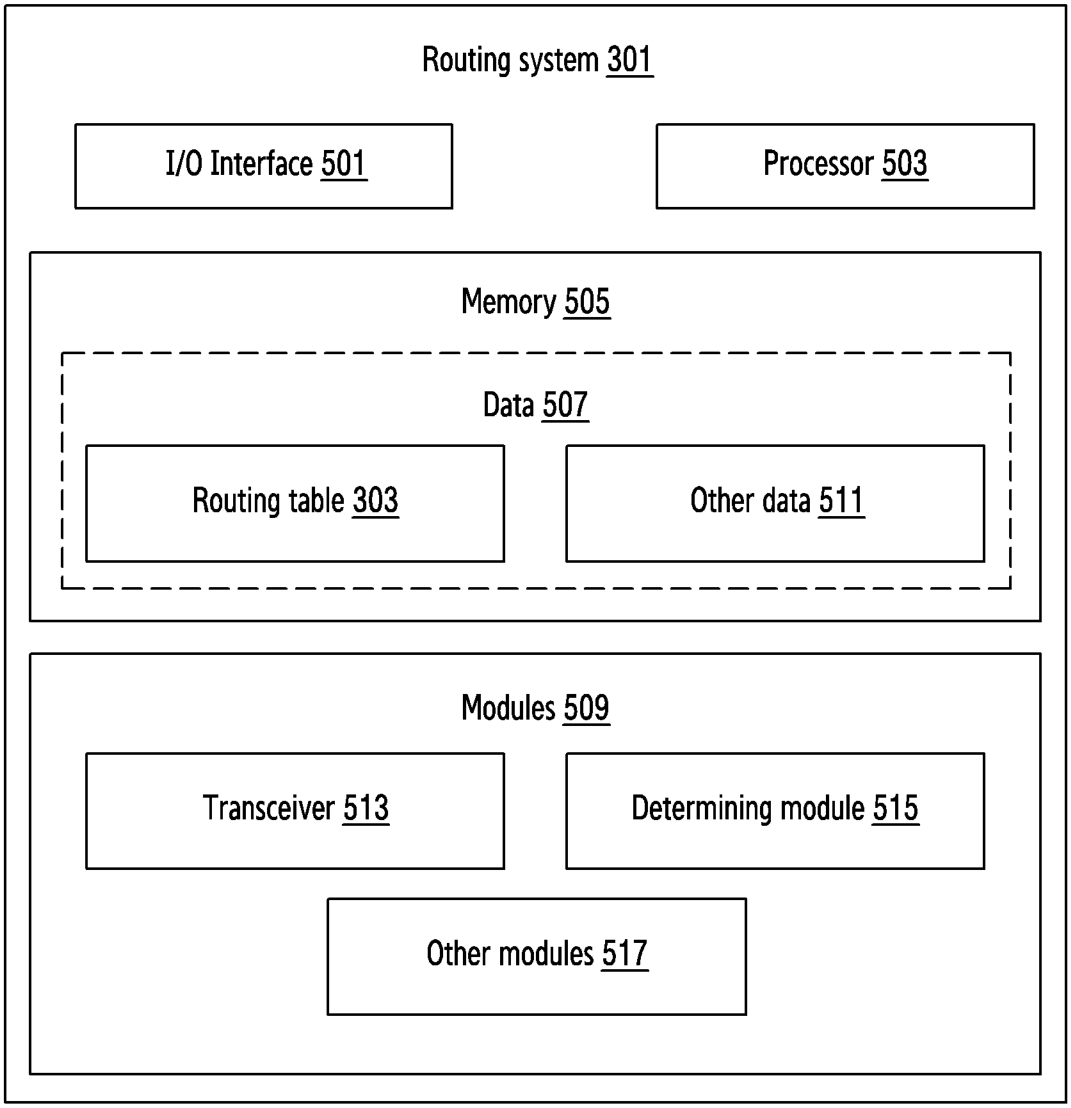
FIG. 5 is a diagram illustrating a routing system, according to an embodiment.

FIG. 5 is a diagram illustrating a routing system, according to an embodiment.

In some implementations, the routing system 301 may include an I/O interface 501, a processor 503 and a memory 505. The memory 505 may be communicatively coupled to the processor 503. The processor 503 may be configured to perform one or more functions of the routing system 301 for communication between a network function 305 and a plurality of RAN nodes, using the data 507 and the one or more modules 509 of the routing system 301. The memory 505 may store data 507.

In an embodiment, the data 507 stored in the memory 505 may include, without limitation, a routing table 303 and other data 511. The data 507 may be stored within the memory 505 in the form of various data structures. Additionally, the data 507 may be organized using data models, such as relational or hierarchical data models. The other data 511 may include various temporary data and files generated by the one or more modules 509.

In an embodiment, the routing table 303 may be used to store an information related to the interface protocol used between each RAN node 307 and the network function 305 for an initial connection. The interface protocol may include, without limitation, one of a P2P interface, a SBI, or combination of both the P2P interface and the SBI. The routing table 303 includes a plurality of entries including serial number of a RAN node 307, truth value for each of one or more interface protocols used by the RAN node and type of interface supported by the RAN node. As an example, the network function 305 may be an AMF. An exemplary routing table for the one or more RAN nodes 307 shown in FIG. 3B is shown in Table 2 below:

TABLE 2

| Serial number of RAN node | Initial setup-P2P | Initial setup- SBI | Interface supported by the RAN node |
|---|---|---|---|
| $307_1$ | TRUE | FALSE | P2P |
| $307_2$ | TRUE | TRUE | P2P |
| $307_3$ | FALSE | TRUE | SBI |

As shown in the FIG. 3B, the initial setup of the RAN node 307$_1$ was based on P2P interface. The value set for initial setup-P2P for the RAN node 307$_1$ in the routing table 303 is TRUE and the value set for initial setup-SBI for the RAN node 307$_1$ in the routing table 303 is FALSE. As shown in the FIG. 3B, the RAN node 307$_2$ supports combination of both the P2P interface and the SBI. However, the initial setup of the RAN node 307$_2$ was based on P2P interface. The value set for initial setup P2P for the RAN node 307$_2$ in the routing table 303 is TRUE and the value set for initial setup SBI for the RAN node 307$_2$ in the routing table 303 is TRUE as the RAN node 307$_2$ supports both the interface protocols. However, as the initial connection with the network function 305 was based on the P2P interface, the network function 305 uses P2P interface for transmitting the message. As shown in the FIG. 3B, the RAN node 307$_3$ supports the SBI. The value set for initial setup P2P for the RAN node 307$_3$ in the routing table 303 is FALSE and the value set for initial setup SBI for the RAN node 307$_3$ in the routing table 303 is TRUE.

In an embodiment, the data 507 may be processed by one or more modules 509 of the routing system 301. The one or more modules 509 may be communicatively coupled to the processor 503 for performing one or more functions of the routing system 301. The one or more modules 509 may include, without limiting to, a transceiver module 513, a determining module 515 and other modules 329.

As used herein, the term module may refer to an ASIC, an electronic circuit, a hardware processor 503 (shared, dedicated, or group) and memory that execute one or more software or firmware programs, a combinational logic circuit, and/or other suitable components that provide the described functionality. Each of the one or more modules 509 may be configured as stand-alone hardware computing units. In an embodiment, the other modules 517 may be used to perform various miscellaneous functionalities on the routing system 301. It will be appreciated that such one or more modules 509 may be represented as a single module or a combination of different modules.

In an embodiment, the transceiver module 513 may be configured for receiving a message from a network function 305 in a core network 205 for transmitting the message to one or more of the plurality of RAN nodes 307. As an example, the message may be a paging information, a broadcast message or a multicast message which may be sent to the one or more RAN nodes 307. Prior to receiving the message, the transceiver module 513 receives the information related to the interface protocol used between each RAN node 307 and the network function 305 for an initial connection. The information related to the interface protocol is stored in the routing table 303.

In an embodiment, the determining module 515 may be configured for an interface protocol to be used for transmitting the message to each RAN node in the one or more RAN nodes 307 based on an interface information stored in the routing table 303.

In an embodiment, the transceiver module 513 may be configured for transmitting the message to the one or more RAN nodes 307 using the determined interface protocol for each RAN node 307. The transceiver module 513 may be configured encapsulating the message according to the determined interface protocol.

Figure 6A:
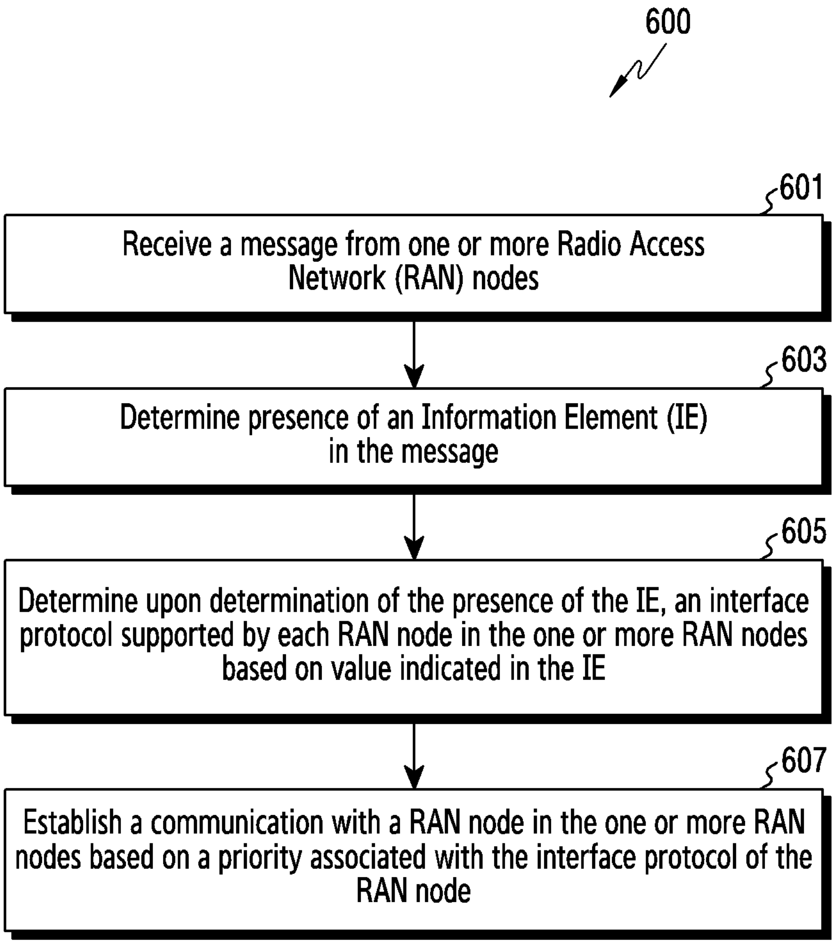
FIG. 6A is a flowchart illustrating a method of communication between a RAN node and a UE, according to an embodiment.

FIG. 6A is a flowchart illustrating a method of communication between a RAN node and a UE 201, according to an embodiment.

As illustrated in FIG. 6A, the method 600 may include one or more blocks illustrating a method of communication between a RAN node and a UE 201 using the UE 201 illustrated in FIG. 3. The method 600 may be described in the general context of computer executable instructions. Generally, computer executable instructions can include routines, programs, objects, components, data structures, procedures, modules, and functions, which perform specific functions or implement specific abstract data types.

The order in which the method 600 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At 601, the method 600 includes receiving, by a processor 403 of the UE 201, a message from one or more RAN nodes 203. The message may include, without limitation, one of an SIB, an MIB, or an RRC configuration message.

At 603, the method 600 includes determining, by the processor 403, presence of an IE in the message. The processor 403 receives services from a RAN node in the one or more RAN nodes 203 through low priority interface protocol when the UE 201 determines absence of the IE in the message.

At 605, the method 600 includes determining, by the processor 403, upon determination of the presence or absence of the IE, an interface protocol supported by each RAN node in the one or more RAN nodes 203 based on value indicated in the IE. The interface protocol may include, without limitation, one of a P2P interface, an SBI, or combination of both the P2P interface and the SBI.

At 607, the method 600 includes establishing, by the processor 403, a communication with a RAN node in the one or more RAN nodes 203 based on a priority associated with the interface protocol of the RAN node. The RAN node supporting SBI or combination of both the P2P interface and the SBI have a higher priority than the RAN node supporting the P2P interface. The processor 403 unsubscribes the RAN node providing services through a higher priority interface protocol when the UE 201 establishes connection with a RAN node which is capable of providing services through a lower priority interface protocol during one of handover of the UE 201 or cell reselection of the UE 201.

Figure 6B:
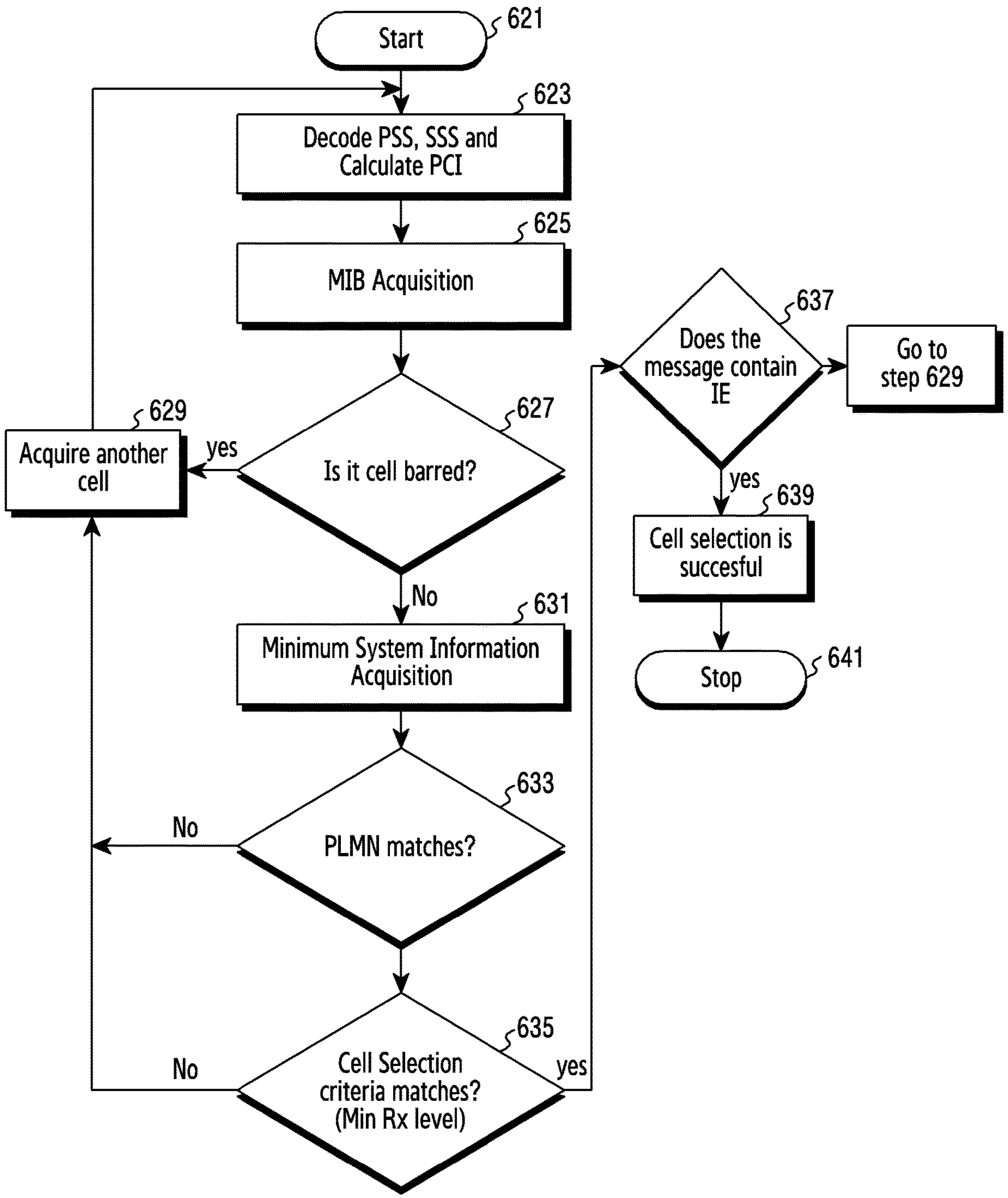
FIG. 6B is a diagram illustrating a call flow for cell selection by a UE, according to an embodiment.

FIG. 6B is a diagram illustrating an exemplary call flow for cell selection by a UE, according to an embodiment.

At 621, the process of cell selection by a UE 201 is started. The process applies when there is already a service being consumed or produced and then a cell selection is required to be done at UE 201 side. At 623, the UE 201 decodes primary synchronization signal (PSS), secondary synchronization signal (SSS), and calculates a physical cell identity using the PSS value and SSS value. At 625, an MIB may be acquired by the UE 201. At 627, the UE 201 may check if the cell is barred. If yes, the UE 201 acquires another cell, at 629. If not, then the UE 201 may read the minimum system information. At 633, the UE 201 may check if a public land mobile network (PLMN) matches the one requested during cell selection procedure as per existing protocols. If the PLMN does not match, the UE 201 may acquire another cell. If the PLMN matches, the UE 201 may check if the cell selection criteria matches including the minimum signal strength thresholds, at 635. If the selection criteria does not match, the UE 201 may acquire another cell. If the selection criteria matches, the UE 201 checks if the IE is present in the message, at 637. If yes, then the UE 201 checks the value of the IE in the message. When the value in the IE is True (1), this indicates that the RAN node supports SBI interface and cell selection is successful, at step 639. Alternatively, when the IE is False (0), this indicates that the RAN node supports combination of both the P2P interface and the SBI. The UE 201 may notify the service end point layer that all services may not be available in the combination of both the P2P interface and the SBI and also indicates that the cell selection is successful, at 639. If the IE is not present in the message, the UE 201 searches another cell (traverses to 629) as the current set of services UE 201 is part of (which is high priority interface protocols such as SBI or combination of both the P2P interface and the SBI) is not available, as UE 201 to prioritizes high interface priority protocols.

Figure 6C:
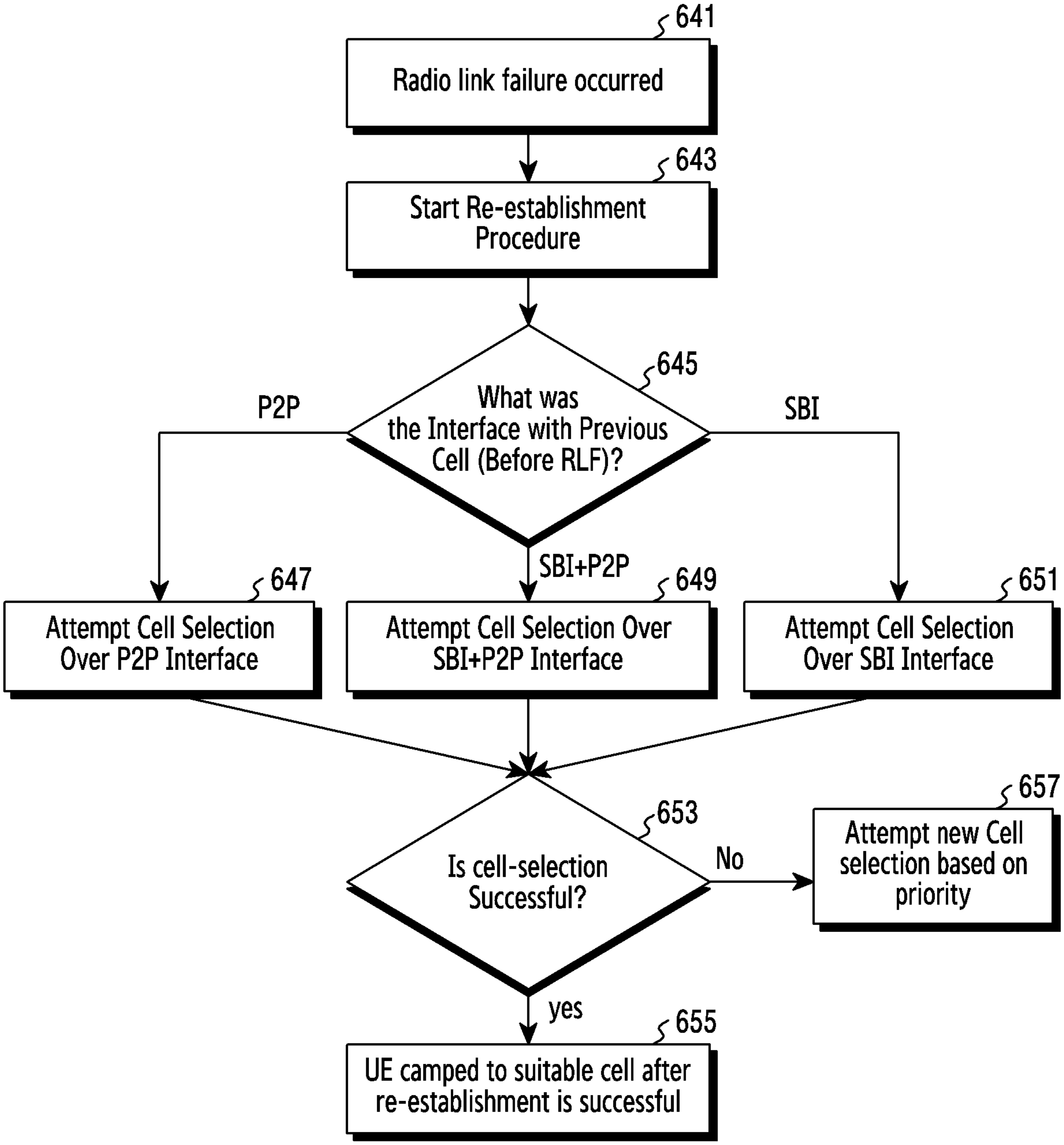
FIG. 6C is a diagram illustrating a call flow during radio link failure (RLF), according to an embodiment.

FIG. 6C is a diagram illustrating a call flow during RLF, according to an embodiment.

At 641, RLF of a UE 201 occurs due to one of out-of-sync, max-retransmission and the like. At 643, a re-establishment procedure is started. As an example, T311 timer may be started. At 645, a previous interface protocol of the UE 201 is determined. Based on the previous interface protocol, the cell selection is attempted using same interface protocol. As an example, if the previous interface protocol of the UE 201 was P2P+SBI, the cell selection is attempted based on the same interface protocol i.e., P2P+SBI. Similarly, if the previous interface protocol of the UE 201 was SBI, the cell selection is attempted based on the same interface protocol i.e., SBI. At 653, if the cell selection was successful, the UE 201 camps on the cell successfully, at 655. If the cell reestablishment failed and/or T311 timer expired, the UE 201 may again perform cell selection, at 657.

Figure 7:
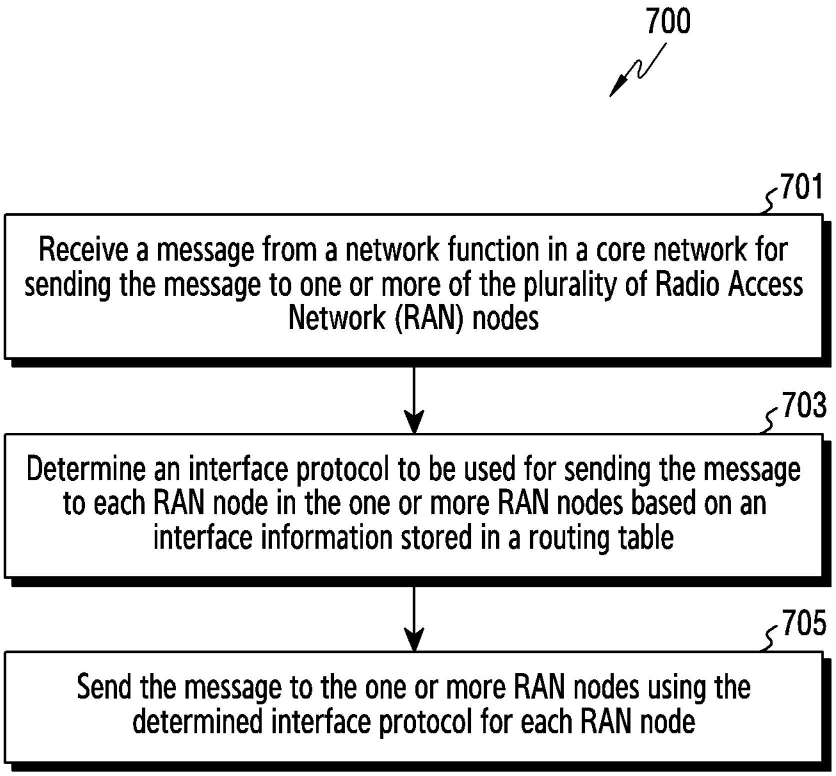
FIG. 7 is a flowchart illustrating method of communication between a network function and a plurality of RAN nodes, according to an embodiment.

FIG. 7 is a flowchart illustrating method of communication between a network function and a plurality of RAN nodes, according to an embodiment.

As illustrated in FIG. 7, a method 700 may include one or more blocks illustrating a method of communication between a network function and a plurality of RAN nodes using the routing system 301 illustrated in FIG. 5. The method 700 may be described in the general context of computer executable instructions. Generally, computer executable instructions can include routines, programs, objects, components, data structures, procedures, modules, and functions, which perform specific functions or implement specific abstract data types.

The order in which the method 700 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At 701, the method 700 includes receiving, by a processor 503 of the UE 201, a message from a network function 305 in a core network 205 for transmitting the message to one or more of the plurality of RAN nodes. As an example, the message may be a paging information, a broadcast message or a multicast message. Prior to receiving the message, processor receives an information related to the interface protocol used between each RAN node and the network function 305 for an initial connection. The information related to the interface protocol is stored in the routing table 303. The routing table 303 is stored in at least one of the network function 305 and outside the network function 305. The interface protocol may include, without limitation, one of a P2P interface, an SBI, or combination of both the P2P interface and the SBI.

At 703, the method 700 includes determining, by the processor 503, the interface protocol to be used for transmitting the message to each RAN node in the one or more RAN nodes 307 based on an interface information stored in the routing table 303. The routing table 303 may include, without limitation, plurality of entries including serial number of a RAN node, truth value for each of one or more interface protocols used by the RAN node and type of interface supported by the RAN node.

At 705, the method 700 includes transmitting, by the processor 503, the message to the one or more RAN nodes 307 using the determined interface protocol for each RAN node 307. The processor encapsulates the message according to the determined interface protocol.

Figure 8A:
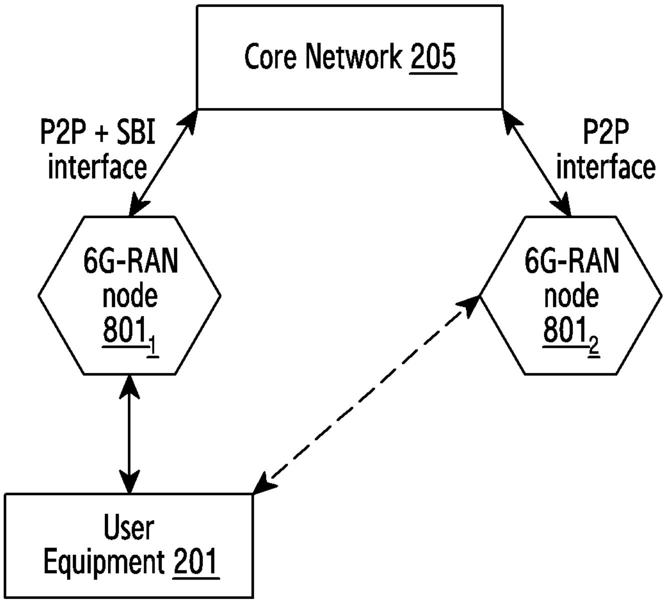
FIG. 8A is a diagram illustrating a UE unsubscribing a RAN node providing services through a higher priority interface protocol, according to an embodiment.
Figure 8B:
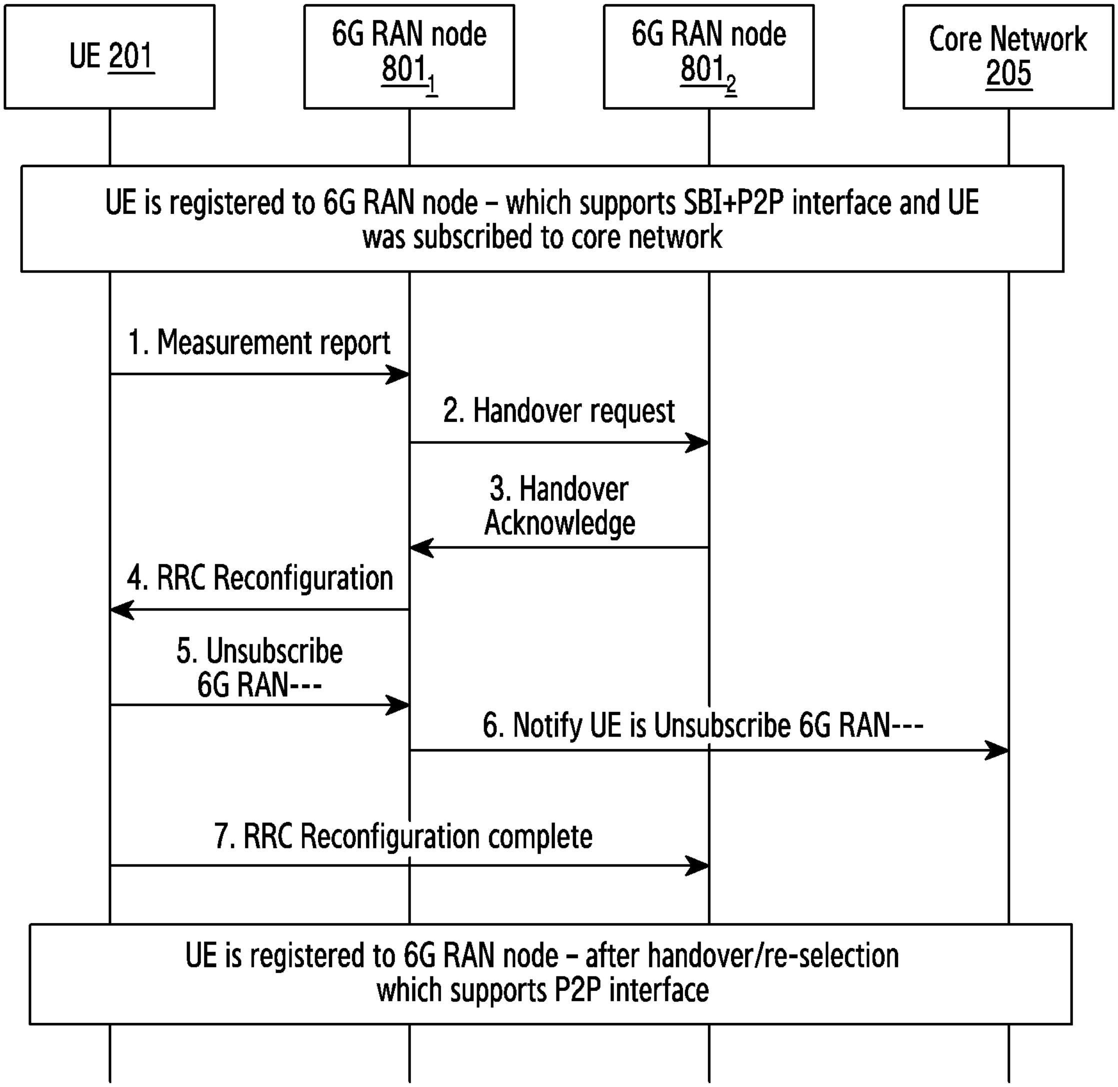
FIG. 8B is a call flow diagram illustrating a UE unsubscribing a RAN node providing services through a higher priority interface protocol, according to an embodiment.

FIG. 8A is a diagram illustrating a UE unsubscribing a RAN node providing services through a higher priority interface protocol, according to an embodiment.

As shown in FIG. 8A, two 6G RAN nodes are associated with a core network 205. The 6G RAN node $\mathbf{801}_1$ supports combination of both the P2P interface and the SBI, whereas the 6G RAN node $\mathbf{801}_2$ supports P2P interface. Consider a scenario in which a UE 201 is connected with the network using 6G RAN node $\mathbf{801}_1$ which supports combination of both the P2P interface and the SBI. During one of, mobility of the UE 201 or cell reselection, the available RAN node $\mathbf{801}_2$ supports only P2P interface. Due to this, the UE 201 may not receive additional service based services which were available with the 6G RAN node $\mathbf{801}_1$. In this scenario, the UE 201 shall unsubscribe the 6G RAN node $\mathbf{801}_1$ providing services through the combination of both the P2P interface and the SBI when the UE 201 establishes connection with the RAN node $\mathbf{801}_2$ which is capable of providing services through P2P interface.

In an embodiment, when the UE 201 unsubscribes the 6G RAN node $\mathbf{801}_1$, the UE 201 may notify existing 6G RAN node $\mathbf{801}_1$ (step 5 of FIG. 8B), that the UE 201 has unsubscribed to the services received through the 6G RAN node $\mathbf{801}_1$, as the new 6G RAN node $\mathbf{801}_2$ supports only P2P interface. Upon receiving the notification, the 6G RAN node $\mathbf{801}_1$ may notify the core network 205 that the UE 201 has unsubscribed to the 6G RAN node $\mathbf{801}_1$ (step 6 of FIG. 8B). After unsubscribing the 6G RAN node $\mathbf{801}_1$ the UE 201 establishes connection with the 6G RAN node $\mathbf{801}_2$, which supports low priority interface i.e., P2P interface (step 7 of FIG. 8B).

Figure 8C:
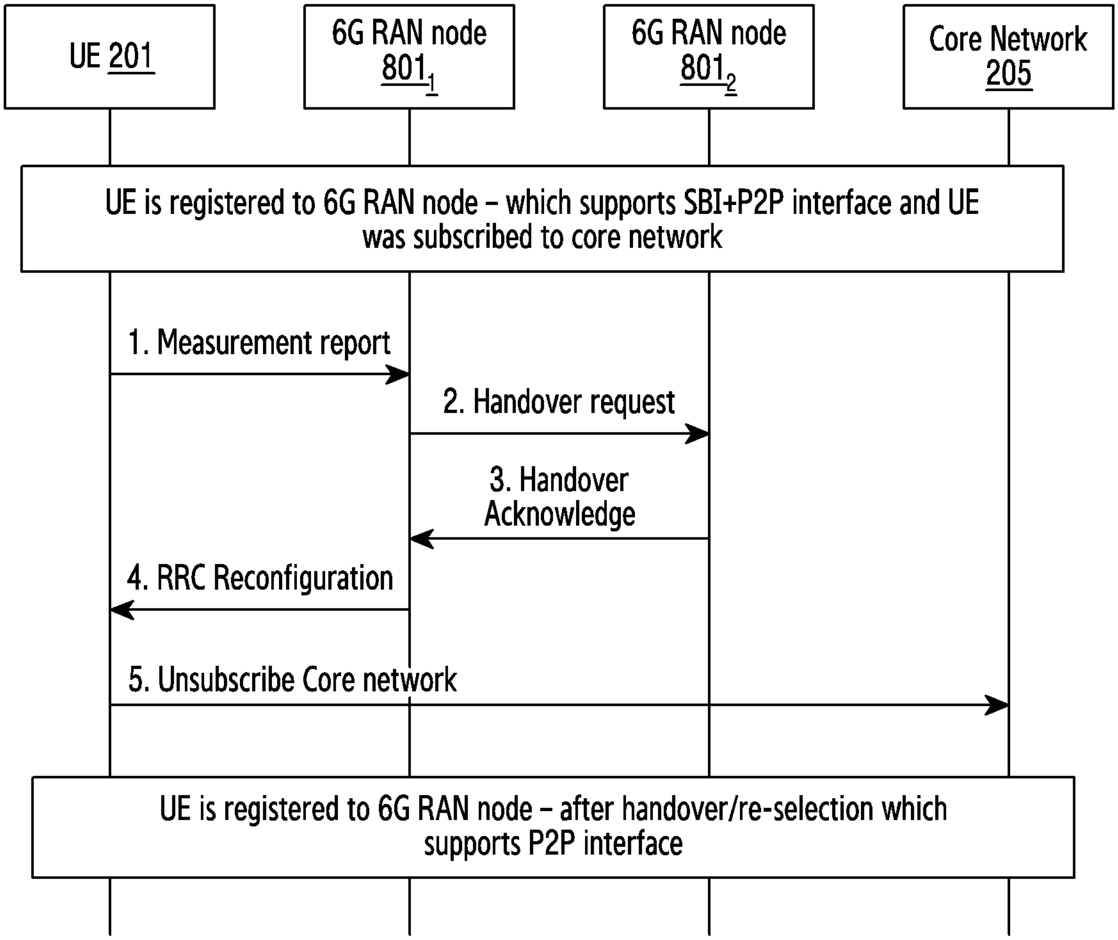
FIG. 8C is a call flow diagram illustrating a UE unsubscribing a RAN node providing services through a higher priority interface protocol, according to an embodiment.

In some embodiments, the UE 201 may notify the core network 205 directly that the UE 201 has unsubscribed to the services received through the 6G RAN node $\mathbf{801}_1$, as the new 6G RAN node $\mathbf{801}_2$ only supports only P2P interface (step 5 of FIG. 8C).

Figure 9:
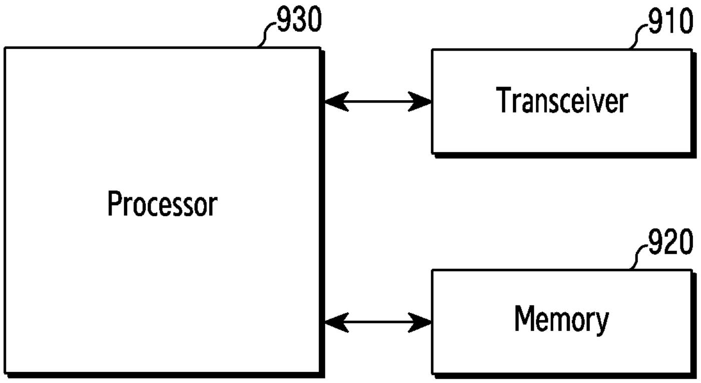
FIG. 9 is a diagram illustrating a terminal (or a UE), according to an embodiment.

FIG. 9 is a block diagram illustrating a terminal (or a UE), according to an embodiment. FIG. 9 corresponds to the UE of FIG. 4.

As shown in FIG. 9, the UE may include a transceiver 910, a memory 920, and a processor 930. The transceiver 910, the memory 920, and the processor 930 of the UE may operate according to a communication method of the UE described above. However, the components of the UE are not limited thereto. For example, the UE may include more or fewer components than those described above. In addition, the processor 930, the transceiver 910, and the memory 920 may be implemented as a single chip. Also, the processor 930 may include at least one processor.

The transceiver 910 collectively refers to a UE receiver and a UE transmitter, and may transmit/receive a signal to/from a base station or a network entity. The signal transmitted or received to or from the base station or a network entity may include control information and data. The transceiver 910 may include a RF transmitter for up-converting and amplifying a frequency of a transmitted signal, and a RF receiver for amplifying low-noise and down-converting a frequency of a received signal. However, this is only an example of the transceiver 910 and components of the transceiver 910 are not limited to the RF transmitter and the RF receiver.

Also, the transceiver 910 may receive and output, to the processor 930, a signal through a wireless channel, and transmit a signal output from the processor 930 through the wireless channel.

The memory 920 may store a program and data required for operations of the UE. Also, the memory 920 may store control information or data included in a signal obtained by the UE. The memory 920 may be a storage medium, such as read-only memory (ROM), random access memory (RAM), a hard disk, a compact disc (CD)-ROM, and a digital versatile disc (DVD), or a combination of storage media.

The processor 930 may control a series of processes such that the UE operates as described above. For example, the transceiver 910 may receive a data signal including a control signal transmitted by the base station or the network entity, and the processor 930 may determine a result of receiving the control signal and the data signal transmitted by the base station or the network entity.

Figure 10:
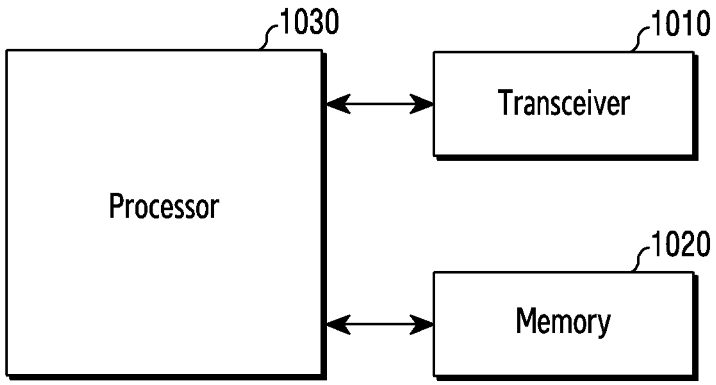
FIG. 10 is a diagram illustrating a base station, according to an embodiment.

FIG. 10 is a block diagram illustrating a base station, according to an embodiment. FIG. 10 corresponds to the RAN node of FIGS. 2A to 3B.

As shown in FIG. 10, the base station may include a transceiver 1010, a memory 1020, and a processor 1030. The transceiver 1010, the memory 1020, and the processor 1030 of the base station may operate according to a communication method of the base station described above. However, the components of the base station are not limited thereto. For example, the base station may include more or fewer components than those described above. In addition, the processor 1030, the transceiver 1010, and the memory 1020 may be implemented as a single chip. Also, the processor 1030 may include at least one processor.

The transceiver 1010 collectively refers to a base station receiver and a base station transmitter, and may transmit/receive a signal to/from a terminal or a network entity. The signal transmitted or received to or from the terminal or a network entity may include control information and data. The transceiver 1010 may include a radio frequency (RF) transmitter for up-converting and amplifying a frequency of a transmitted signal, and an RF receiver for amplifying low-noise and down-converting a frequency of a received signal. However, this is only an example of the transceiver 1010 and components of the transceiver 1010 are not limited to the RF transmitter and the RF receiver.

Also, the transceiver 1010 may receive and output, to the processor 1030, a signal through a wireless channel, and transmit a signal output from the processor 1030 through the wireless channel.

The memory 1020 may store a program and data required for operations of the base station. Also, the memory 1020 may store control information or data included in a signal obtained by the base station. The memory 1020 may be a storage medium, such as ROM, RAM, a hard disk, a CD-ROM, and a DVD, or a combination of storage media.

The processor 1030 may control a series of processes such that the base station operates as described above. For example, the transceiver 1010 may receive a data signal including a control signal transmitted by the terminal, and the processor 1030 may determine a result of receiving the control signal and the data signal transmitted by the terminal.

Figure 11:
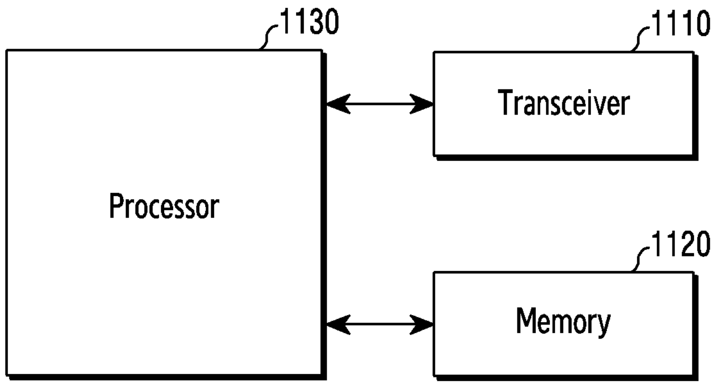
FIG. 11 is a diagram illustrating of a network entity, according to an embodiment.

FIG. 11 is a block diagram illustrating a network entity, according to an embodiment. FIG. 11 corresponds to the core network entity of FIGS. 1A to 2B.

As shown in FIG. 11, the network entity may include a transceiver 1110, a memory 1120, and a processor 1130. The transceiver 1110, the memory 1120, and the processor 1130 of the network entity may operate according to a communication method of the network entity described above. However, the components of the network entity are not limited thereto. For example, the network entity may include more or fewer components than those described above. In addition, the processor 1130, the transceiver 1110, and the memory 1120 may be implemented as a single chip. Also, the processor 1130 may include at least one processor.

The transceiver 1110 collectively refers to a network entity receiver and a network entity transmitter, and may transmit/receive a signal to/from a terminal or other network entity. The signal transmitted or received to or from the terminal or other network entity may include control information and data. The transceiver 1110 may include a RF transmitter for up-converting and amplifying a frequency of a transmitted signal, and a RF receiver for amplifying low-noise and down-converting a frequency of a received signal. However, this is only an example of the transceiver 1110 and components of the transceiver 1110 are not limited to the RF transmitter and the RF receiver.

Also, the transceiver 1110 may receive and output, to the processor 1130, a signal through a wireless channel, and transmit a signal output from the processor 1130 through the wireless channel.

The memory 1120 may store a program and data required for operations of the network entity. Also, the memory 1120 may store control information or data included in a signal obtained by the network entity. The memory 1120 may be a storage medium, such as ROM, RAM, a hard disk, a CD-ROM, and a DVD, or a combination of storage media.

The processor 1130 may control a series of processes such that the network entity operates as described above. For example, the transceiver 1110 may receive a data signal including a control signal transmitted by the terminal, and the processor 1130 may determine a result of receiving the control signal and the data signal transmitted by the terminal.

In the afore-described embodiments of the present disclosure, elements included in the present disclosure are expressed in a singular or plural form according to the embodiments. However, the singular or plural form is appropriately selected for convenience of explanation and the present disclosure is not limited thereto. As such, an element expressed in a plural form may also be configured as a single element, and an element expressed in a singular form may also be configured as plural elements.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

The proposed method introduces an IE in the message which helps a UE to establish a communication with a RAN node supporting high priority interface protocol (SBI or combination of both the P2P interface and the SBI).

The proposed method proposes a routing table which is used to store information related to the interface protocol used between each RAN node and the network function for an initial connection. The information in the routing table is used by the network function to transmit the message to RAN nodes using the determined interface protocol for each RAN node.

Using the proposed solution, the UE will be able to unsubscribe the RAN node providing services through a higher priority interface protocol when the UE establishes connection with a RAN node which is capable of providing services through a lower priority interface protocol during one of handover of the UE or cell reselection of the UE.

In light of the technical advancements provided by the disclosed method, the claimed steps, as discussed above, are not routine, conventional, or well-known aspects in the art, as the claimed steps provide the aforesaid solutions to the technical problems existing in the conventional technologies. Further, the claimed steps clearly bring an improvement in the functioning of the system itself, as the claimed steps provide a technical solution to a technical problem.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device/article is described herein (whether they cooperate), it will be clear that a single device/article may be used in place of the more than one device/article or a different number of devices/articles may be used instead of the shown number of devices or programs. The functionality and/or features of a device may be alternatively embodied by one or more other devices which are not explicitly described as having such functionality/features. Thus, other embodiments of invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method performed by a user equipment (UE), the method comprising:

receiving a message from one or more radio access network (RAN) nodes;

determining presence of an information element (IE) in the message;

determining an interface protocol supported by each of the one or more RAN nodes based on a value indicated in the IE; and establishing communication with a first RAN node of the one or more RAN nodes based on a priority associated with the interface protocol of the first RAN node.

2. The method of claim 1, wherein the interface protocol comprises one of a point-to-point (P2P) interface, a service-based interface (SBI), or a combination of the P2P interface and the SBI.

3. The method of claim 1, wherein the UE receives services from a second RAN node of the one or more RAN nodes through low priority interface protocol when the UE determines absence of the IE in the message.

4. The method of claim 3, wherein the UE unsubscribes a third RAN node providing services through a higher priority interface protocol when the UE establishes connection with a fourth RAN node that is capable of providing services through a lower priority interface protocol during one of handover of the UE or cell reselection of the UE.

5. The method of claim 1, wherein a RAN node supporting an SBI or combination of a P2P interface and the SBI has a higher priority than another RAN node supporting the P2P interface.

6. The method of claim 1, wherein the message comprises one of a system information block (SIB), a master information block (MIB), or a radio resource control (RRC) configuration message.

7. A method performed by a network entity in a wireless communication system, the method comprising:

determining an interface protocol to be used for transmitting a message to each of one or more RAN nodes based on interface information stored in a routing table; and transmitting the message to the one or more RAN nodes using the determined interface protocol for each of the one or more RAN nodes.

8. The method of claim 7, wherein, prior to receiving the message, the method comprises:

receiving information related to the interface protocol used between each RAN node and the network entity for an initial connection, wherein the information related to the interface protocol is stored in the routing table.

9. The method of claim 7, wherein the routing table is stored in at least one of the network entity and outside the network entity.

10. The method of claim 7, wherein the interface protocol comprises one of a point-to-point (P2P) interface, a service-based interface (SBI), or a combination of the P2P interface and the SBI.

11. The method of claim 7, wherein transmitting the message comprises:

encapsulating the message according to the determined interface protocol.

12. The method of claim 7, wherein the routing table comprises plurality of entries comprising a serial number of a RAN node, a truth value for each of one or more interface protocols used by the RAN node, and a type of interface supported by the RAN node.

13. A user equipment (UE) in a wireless communication system, the UE comprising:

a transceiver, and a controller coupled with the transceiver and configured to:

receive a message from one or more radio access network (RAN) nodes;

determine presence of an information element (IE) in the message;

determine an interface protocol supported by each of the one or more RAN nodes based on a value indicated in the IE; and establish communication with a first RAN node of the one or more RAN nodes based on a priority associated with the interface protocol of the first RAN node.

14. The UE of claim 13, wherein the interface protocol comprises one of a point-to-point (P2P) interface, a service-based interface (SBI), or a combination of the P2P interface and the SBI.

15. The UE of claim 13, wherein the UE receives services from a second RAN node of the one or more RAN nodes through low priority interface protocol when the UE determines absence of the IE in the message.

16. The UE of claim 15, wherein the UE unsubscribes a third RAN node providing services through a higher priority interface protocol when the UE establishes connection with a fourth RAN node that is capable of providing services through a lower priority interface protocol during one of handover of the UE or cell reselection of the UE.

17. The UE of claim 13, wherein a RAN node supporting an SBI or a combination of both a P2P interface and the SBI has a higher priority than another RAN node supporting the P2P interface, wherein the message comprises one of a system information block (SIB), a master information block (MIB), or a radio resource control (RRC) configuration message.

18. A network entity in a wireless communication system, the network entity comprising:

a transceiver, and a controller coupled with the transceiver and configured to:

determine an interface protocol to be used for transmitting a message to each of one or more RAN nodes based on interface information stored in a routing table; and transmit the message to the one or more RAN nodes using the determined interface protocol for each of the one or more RAN nodes.

19. The network entity of claim 18, wherein, prior to receiving the message, the processor is configured to:

receive information related to the interface protocol used between each RAN node and the network entity for an initial connection, wherein the information related to the interface protocol is stored in the routing table.

20. The network entity of claim 18, wherein the routing table is stored in at least one of the network entity or outside the network function, wherein the interface protocol comprises one of a point-to-point (P2P) interface, a service-based interface (SBI), or a combination of both the P2P interface and the SBI, and wherein the routing table comprises plurality of entries comprising a serial number of a RAN node, a truth value for each of one or more interface protocols used by the RAN node, and a type of interface supported by the RAN node.

* * * * *